Patented May 11, 1954

2,677,917

UNITED STATES PATENT OFFICE 2,677,917

MUSHROOM SPAWN AND METHOD OF PREPARING THE SAME

Edgar B. Speakman, Avondale, Pa.

No Drawing. Application March 25, 1949,
Serial No. 83,511

8 Claims. (Cl. 47—1.1)

This invention has general reference to mushroom spawn and methods of preparing the same while it relates, more particularly, to the species or forms thereof involving the use of a substrate other than excremental matter.

Numerous substances or materials have been used as substrates to induce the growth of mushroom spawn, whereas the primary object of my invention is to utilize a novel granular base, or a combination of such base with nutrients, for the propagation of a mushroom spawn that is of more finely divided character than heretofore possible with a considerable saving in production time and labor costs, and whereby the planting of the spawn is materially facilitated.

Another object of my invention is the production of a novel species of mushroom spawn upon which the mycelium vegetative thallus grows rapidly, and which is additionally capable of remaining in excellent condition over lengthy periods of time when storage is necessary, to accumulate volume, in order to meet different supply demands wihtout loss in its productive value.

A further object of my invention is to provide a novel species of mushroom spawn which is far less liable to destructive attack by rats, mice and other vermin.

Subsidiary objects, with ancillary advantages, will be hereinafter disclosed or become apparent from the following detailed description of my invention; while the appended claims succintly define the features of novelty over the prior art.

All of the foregoing objects are practically attained by the use of a durable wood charcoal, as the base and preferably of granular proportions, treating such granules with a cereal-and-water coating adherent, and then subjecting the coated grains to an excess moisture removing or eliminating admixture of very fine, or air-float grade, powdered wood charcoal and chalk in substantially equal volumetric proportions to effectively and positively eliminate any sticky tendency between said grains or particles. The resultant material is then conveniently funneled into conventional spawn bottles, which are thereupon closed by aid of cotton plugs and consecutively subjected to sterilization, cooling, inoculation and incubation.

As a typical example of how to produce a unit or one quart of my novel mushroom spawn substrate I conveniently take four-and-one-half ounces of hard wood or cypress charcoal suitably screened or graded to granular proportions, and add the same to a combination mixture composed of approximately six ounces of cold water with three ounces of whole wheat flour.

The blending of the wood charcoal granules and the combination flour-water substrate mixture may be manually effected in a suitable vessel of convenient size to prevent spillage; or such blending may be carried out in a mechanical device, such as a dough mixer.

The wood charcoal granules are preferably added to the coating mixture of flour and water, in a dry condition so as to ensure effective adherence thereto of said mixture partly by absorption from within said granules. The resultant coated and/or moist and sticky granular mass is thereupon blended with an admixture of two-and-one-half ounces of very fine, air-float grade for example wood charcoal and precipitated or prepared chalk (in approximately equal volumetric proportions) so as to effectively separate the coated wood charcoal grains, and to maintain them so separated incidental to absorption of the excess moisture. While I preferably use whole wheat flour in the coating mixture, it is to be understood that I am not thereby restricted inasmuch as finely ground "Kafir Corn" serves equally well, whereas gypsum or powdered limestone may be substituted for the chalk with equally satisfactory results.

The moist granular material is thereupon appropriately funneled into ordinary spawn bottles, and said bottles closed with cotton plugs preparatory to sterilization, cooling, inoculation with the desirable mycelium, and finally incubated in accordance with known procedure.

It is to be remarked that by the use of wood charcoal base I am enabled to utilize the most desirable period of time to effect complete sterilization of the coated granular material. The wood charcoal remaining unaffected by the heat no difficulty is experienced when subsequently shaken to distribute the inoculant medium; while the mycelium grows rapidly upon such medium and has capacity to remain in excellent condition for longer periods of time during the accumulation of stock to meet particular supply demands. It is furthermore to be noted that wood charcoal, incidental to having been subjected to high temperatures during its manufacture, constitutes an ideal base for mushroom spawn production. Still further wood charcoal discourages the development of mold and bacterial activity, it being a source of carbon, phosphorous and potash. Each unit of my improved mushroom or wood charcoal spawn, prepared in substantially the proportions hereinbefore stated and in accordance with the method described, contains less actual moisture and is lighter in weight volumetrically, than any known grain spawn; whereas it is ready for planting in from ten to fourteen days after inoculation and thereby effects a saving of time that is an obvious advantage. The size of the particles may be varied from very fine to coarse to make different methods of planting possible. For example, the finer particles or "spawn" can be "dusted" on the beds and penetration of the manure accomplished by watering. This method of planting saves valuable time and labor with a corresponding decrease in expense for the mushroom producer. Still further advantages inhering to my invention are the saving involved in preparing the spawn, as well as the proportionately smaller quantity of vital materials required.

Having thus described my invention, I claim:

1. Mushroom spawn composed of a wood charcoal granular base having an applied cereal-and-water substrate coating, and a moisture-removing admixture of fine powdered wood charcoal and chalk.

2. Mushroom spawn composed of a durable wood charcoal granular base having a cereal substrate coating, and a moisture-removing admixture of very finely powdered wood charcoal and prepared chalk.

3. Mushroom spawn comprising granulated hard wood charcoal granules including about one part by weight of said granules to two parts by weight of a cereal-and-water substrate, said substrate being in approximately the proportions of one part by weight of cereal to two parts by weight of water; and an excess-moisture eliminator consisting of powdered wood charcoal and prepared chalk in approximately equal volumetric proportions.

4. A unit or one quart quantity of mushroom spawn comprising approximately 4.5 ounces of granulated hard wood charcoal, a cereal substrate adherent consisting of about 6 ounces of water and 3 ounces of whole wheat flour, and 2.5 ounces of an excess moisture eliminator composed of finely powdered wood charcoal and chalk in substantially equal volumetric proportions.

5. The method of preparing mushroom spawn which comprises granulating a durable wood charcoal, mixing the granules with a cereal substrate to provide a coating over the individual granules, and blending the coated granules with an admixture of powdered wood charcoal and chalk to remove surplus moisture and thereby eliminate adhesion between said coated granules.

6. The method of preparing mushroom spawn which comprises granulating wood charcoal, mixing the granules with a cereal-and-water substrate in approximately the proportions of one part granules to two parts of the cereal by weight, and blending the substrate treated granules with an admixture of powdered wood charcoal and chalk in substantially equal volumetric proportions to remove the surplus moisture and thereby eliminate adhesion between the treated granules aforesaid.

7. The method of preparing one quart or unit of mushroom spawn which comprises granulating durable wood charcoal; mixing about 4.5 ounces of the granulated wood charcoal with a combination cereal-and-water substrate approximately in the proportions of 6 ounces of cold water to 3 ounces of whole wheat flour; and blending the cereal coated granules with an admixture consisting of air float grade wood charcoal and prepared chalk preferably in equal volumetric proportions to effectively prevent said grains from relative adhesion.

8. The method of preparing mushroom spawn in accordance with claim 7 further characterized by filling the prepared wood charcoal granules into conventional spawn receptacles preparatory to the consecutive steps of sterilization, cooling, inoculation with a desirable mycelium, and incubation.

References Cited in the file of this patent

UNITED STATES PATENTS

| Number | Name | Date |
| --- | --- | --- |
| 99,094 | Lassing | Jan. 25, 1870 |
| 1,832,593 | Szucs | Nov. 17, 1931 |
| 1,869,517 | Sinden | Aug. 2, 1932 |
| 2,005,365 | Di Giacinto | June 18, 1935 |
| 2,044,861 | Sinden | June 23, 1936 |
| 2,338,259 | Rettew | Jan. 4, 1944 |

FOREIGN PATENTS

| Number | Country | Date |
| --- | --- | --- |
| 348,184 | Great Britain | May 8, 1931 |
| 206,735 | Switzerland | Dec. 16, 1939 |